United States Patent
Frey

[19]

[11] Patent Number: 5,934,845
[45] Date of Patent: Aug. 10, 1999

[54] HOLE SAW WITH MODIFIED PILOT AND PLUG BIASING

[76] Inventor: Henry E. Frey, 9 Community Rd., Coram, N.Y. 11727

[21] Appl. No.: 09/031,288

[22] Filed: Feb. 26, 1998

[51] Int. Cl.$^6$ .................................................. B23B 51/04
[52] U.S. Cl. ........................... 408/68; 408/204; 408/224; 408/703
[58] Field of Search ................. 408/67, 68, 204, 408/206, 201, 223, 224, 703

[56] References Cited

U.S. PATENT DOCUMENTS

| | | | |
|---|---|---|---|
| 1,449,790 | 3/1923 | Sprague | 408/206 |
| 2,444,099 | 6/1948 | Hennessey, Jr. | 408/206 |
| 2,473,077 | 6/1949 | Starbuck, Jr. | 408/206 |
| 3,648,508 | 3/1972 | Hougen | 408/204 |
| 3,758,222 | 9/1973 | Oakes | 408/224 |
| 3,825,362 | 7/1974 | Hougen | 408/68 |
| 4,093,395 | 6/1978 | Luebbert et al. | 408/224 |
| 4,303,357 | 12/1981 | Makar | 408/204 |
| 4,422,811 | 12/1983 | Ellison et al. | 408/204 |

FOREIGN PATENT DOCUMENTS

| | | | |
|---|---|---|---|
| 2135 | of 1854 | United Kingdom | 408/224 |
| 26668 | of 1908 | United Kingdom | 408/223 |
| 1589293 | 5/1981 | United Kingdom | 408/68 |

*Primary Examiner*—Steven C. Bishop
*Attorney, Agent, or Firm*—Galgano & Burke

[57] ABSTRACT

A hole saw includes a mandrel having a central pilot drill bit having a tapered shank to facilitate removal of the plug and an annular cutting saw blade. A helical spring is preferred coaxially mounted between the saw blade and the pilot. The spring biases the plug as the hole is being cut and automatically ejects the plug from the saw. According to a presently preferred embodiment, the spring is a conically tapered helical compression spring. Additional embodiments of modified pilots are also provided wherein the pilot is stepped, fluted, bulged, stepped and fluted, tapered and bulged, tapered with a fluted bulge, and tapered with a fluted rectangular section. The hole saw of the invention is inexpensive to manufacture and easy to use. Depending on the choice of pilot and the material cut, the plug will automatically eject from the saw or will eject after tapping the saw.

12 Claims, 4 Drawing Sheets

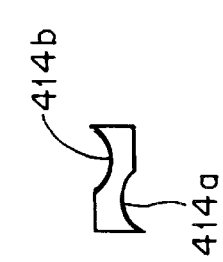
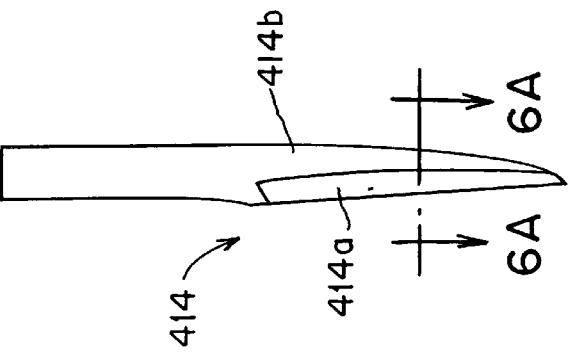
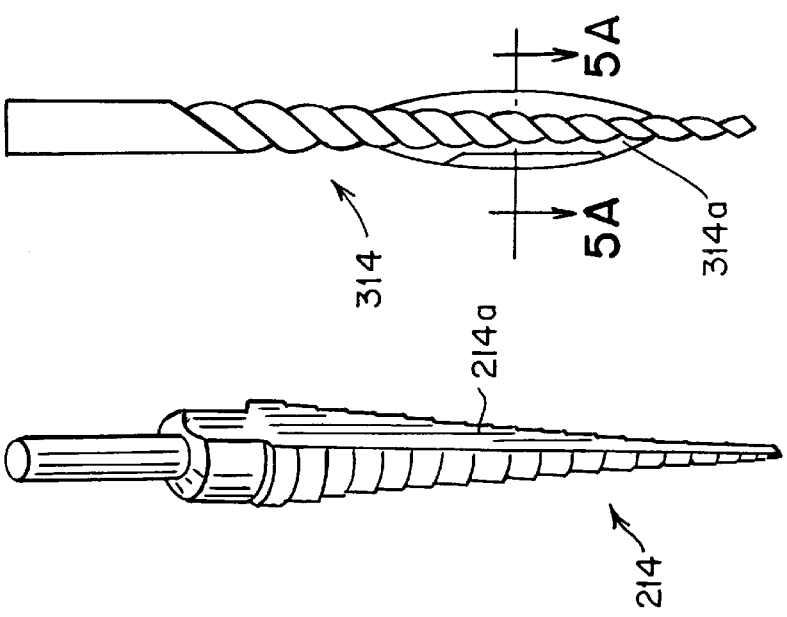
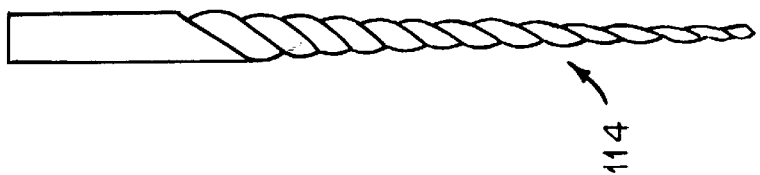
FIG. 3   FIG. 4   FIG. 5   FIG. 5A   FIG. 6   FIG. 6A

HOLE SAW WITH MODIFIED PILOT AND PLUG BIASING

BACKGROUND OF THE INVENTION

1. Field of the Invention

The invention relates to a hole saw. More particularly, the invention relates to a hole saw having a tapered pilot drill which allows for rapid and easy removal of a cut plug from the hole saw.

2. State of the Art

Hole saws are well known in the art and a typical hole saw is shown in prior art FIG. 1. The prior art hole saw 10, generally includes a mandrel 12 having a central cylindrical pilot drill bit 14, and an annular cutting saw blade 16. The saw blade 16 is substantially cylindrical with cutting teeth 16a at its distal end and a mounting flange 16b at its proximal end, defining a cylindrical space 16c therebetween. The mounting flange 16b is coupled to the mandrel 12 so that the saw blade 16 is substantially coaxial with the pilot 14. Mandrel 12 is provided with a proximal shank 18 which is typically sized to fit a conventional hand operated power drill (not shown).

The hole saw 10 is used by attaching the shank 18 to a power drill and aligning the point of the pilot drill 14 with the center of a circle to be cut out of a board or the like (not shown). The pilot helps to center the hole saw as the hole is being cut. As the pilot 14 advances through the board, the annular saw blade 16 eventually engages the board and begins to cut a circular hole around the pilot. When the blade 16 passes through the board, an annular plug is removed from the board. The plug resides on the pilot 14 and within the cylindrical portion of the saw 16 and must be removed from the hole saw 10. Depending on the material which is cut, removal of the plug from the saw can be quite difficult and may require removal of the blade 16 from the mandrel 12.

There have been many attempts to design a better hole saw in which removal of the cut plug is facilitated. U.S. Pat. No. 2,473,077 to Starbuck, Jr. discloses a trepanning tool which is similar to the hole saw 10 shown and described above. The trepanning tool has helical slots in the cylindrical portion of the saw. A cut plug can be removed from the saw by inserting a suitable tool into one or more of the slots to push the plug out of the saw. U.S. Pat. No. 3,648,508 to Hougen provides a knock-out hole in the base of the saw which can be used with a suitable tool in a similar manner. Both of these hole saws require the use of an additional "suitable tool" in order to remove the plug from the saw.

U.S. Pat. No. 3,825,362 to Hougen discloses a hole saw having a spring biased cylindrical pilot having a pointed tip (see, e.g. FIGS. 1–4) or a recessed tip (see, e.g. FIGS. 11–15). In theory, the pilot will only penetrate the board up to the base of the tip or the point of the step in the pilot and the biasing spring will push the pilot carrying the plug out of the saw. While possibly effective, this device is unusually complex and relatively expensive to manufacture.

SUMMARY OF THE INVENTION

It is therefore an object of the invention to provide a hole saw which substantially automatically facilitates removal of a cut plug from the saw.

It is also an object of the invention to provide a hole saw which is inexpensive to manufacture and which is easy to use.

In accord with these objects which will be discussed in detail below, the hole saw of the present invention preferably includes a mandrel having a central pilot drill bit having a tapered shank and, preferably, an annular cutting saw blade with a helical spring coaxially mounted between the saw blade and the pilot. The spring biases the plug as the hole is being cut and automatically ejects the plug from the saw. In addition, the pilot drill bit is preferably tapered to facilitate removal of the plug. According to a presently preferred embodiment, the spring is a conically tapered helical compression spring. Additional embodiments of modified pilots are also provided wherein the pilot is stepped, fluted, bulged, stepped and fluted, tapered and bulged, tapered with a fluted bulge, and tapered with a fluted rectangular section. The hole saw of the invention is inexpensive to manufacture and easy to use. Depending on the choice of pilot and the material cut, the plug will automatically eject from the saw or will eject after tapping the saw. Additional objects and advantages of the invention will become apparent to those skilled in the art upon reference to the detailed description taken in conjunction with the provided figures.

BRIEF DESCRIPTION OF THE DRAWINGS

These and other objects and advantages of the present invention will become apparent from the following description of the accompanying drawings which disclose several embodiments of the present invention. It is to be understood that the drawings are to be used for the purpose of illustration only and not as a definition of the invention.

In the drawings, wherein similar reference numerals denote similar elements throughout the several views:

FIG. 3 is a side elevational view of a first embodiment of a pilot drill according to the invention;

FIG. 4 is a perspective view of a second embodiment of a pilot drill according to the invention;

FIG. 5 is a side elevational view of a third embodiment of a pilot drill according to the invention;

FIG. 5A is a sectional view taken along line 5A—5A in FIG. 5;

FIG. 6 is a side elevational view of a fourth embodiment of a pilot drill according to the invention;

FIG. 6A is a sectional view taken along line 6A—6A in FIG. 6;

DETAILED DESCRIPTION OF THE PREFERRED EMBODIMENTS

Figure 1:
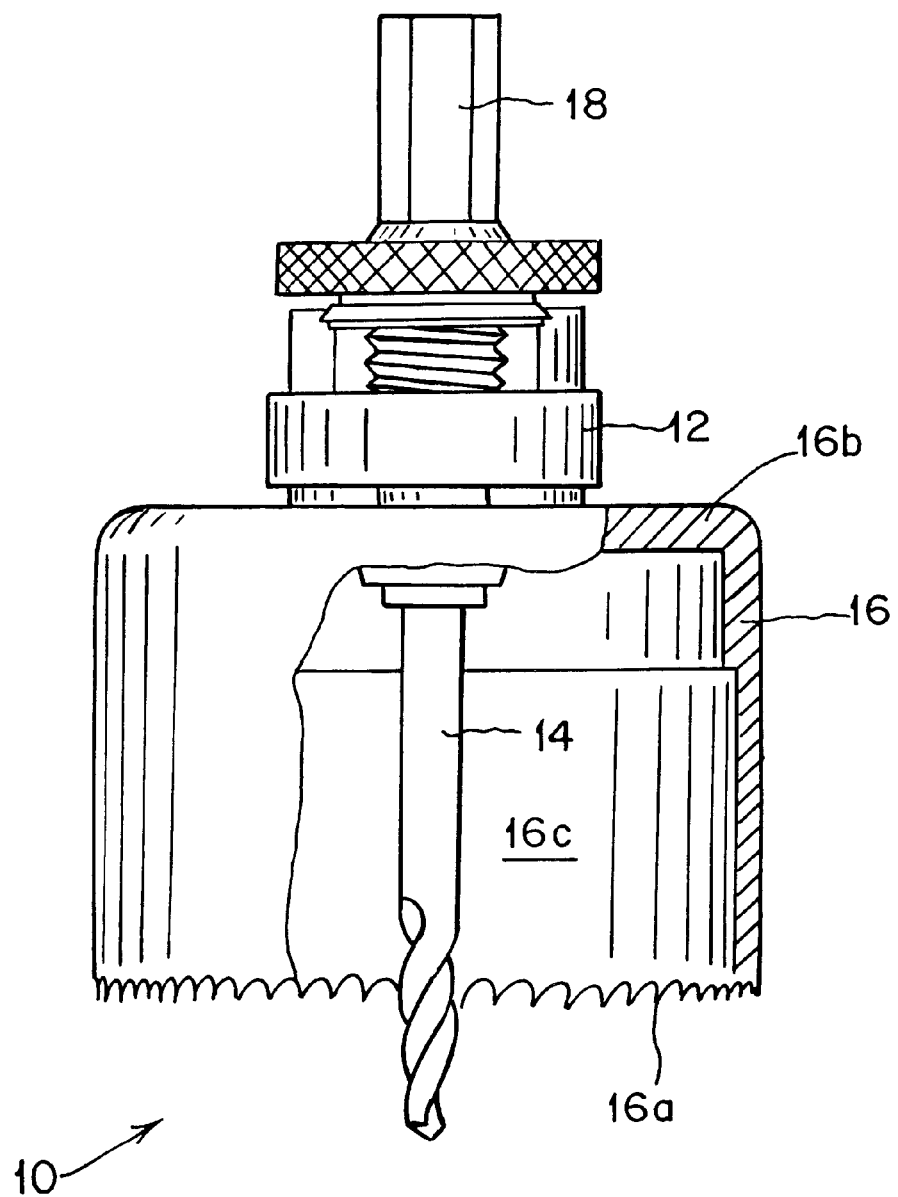
FIG. 1 is a side elevational view in partial section of a prior art hole saw.
Figure 2:
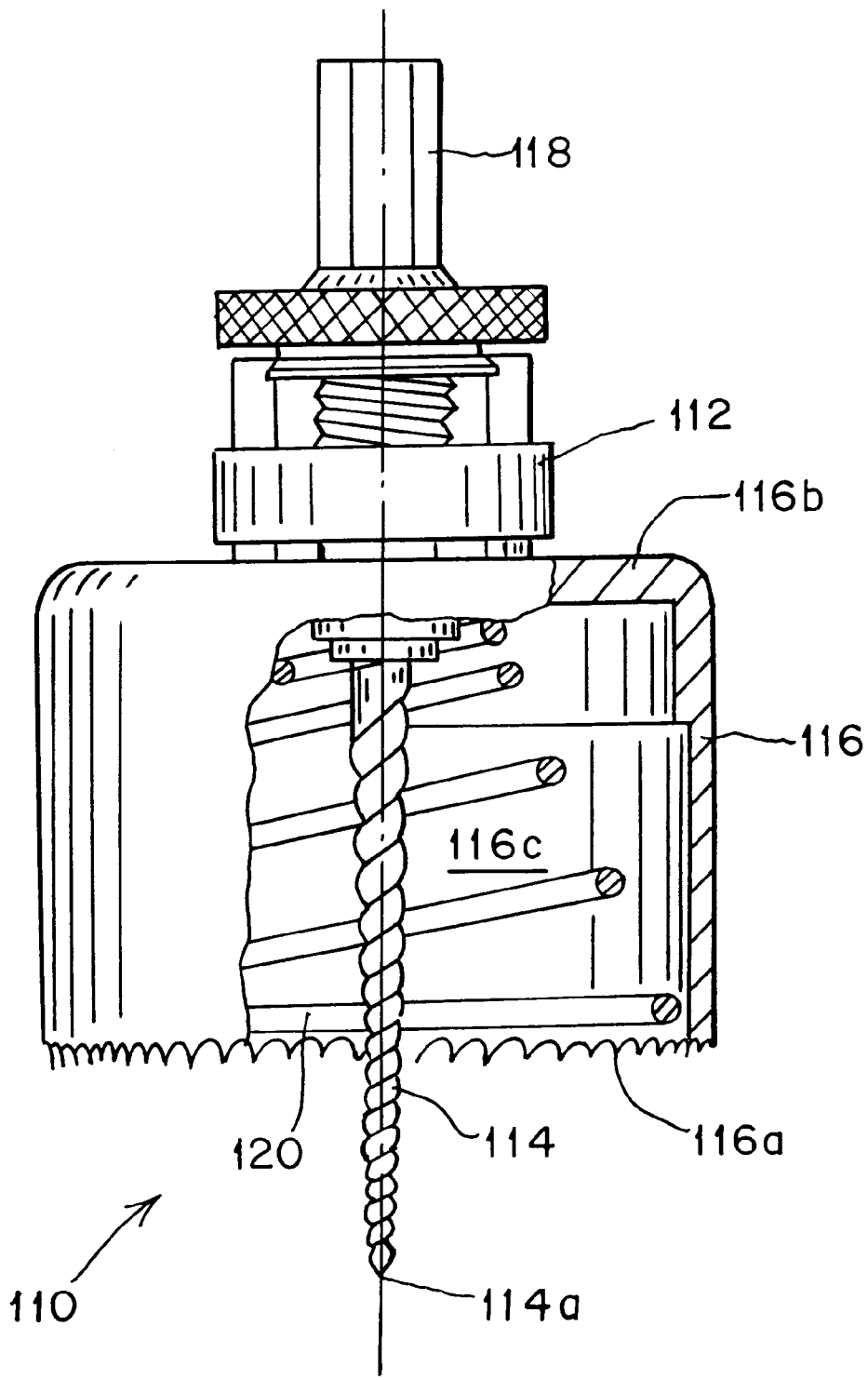
FIG. 2 is a side elevational view in partial section of a first embodiment of a hole saw according to the invention.

Referring now to FIGS. 2 and 3, a presently preferred embodiment of a hole saw 110 according to the invention includes a mandrel 112 having a central pilot drill bit 114 having a tapered shank and an annular cutting saw blade 116. The pilot drill 114 is tapered to a point 114a along substantially its entire length as shown in FIG. 2. The saw blade 116 is substantially cylindrical with cutting teeth 116a at its distal end and a mounting flange 116b at its proximal end, defining a cylindrical space 116c therebetween. The mounting flange 116b is coupled to the mandrel 112 so that the saw blade is substantially coaxial with the pilot 114. The mandrel is provided with a proximal shank 118 which typically sized to fit a conventional hand operated power drill (not shown).

According to a preferred embodiment of the invention, a helical spring 120 is arranged in the cylindrical space 116c and preferably in the annulus between the saw blade 116 and the pilot 114. More preferably, the spring 120 is conically tapered toward the mounting flange 116b of the saw blade 116. The spring may be coupled to either the mandrel 112, the pilot drill 114, or the saw blade 116 in any of several ways such as force fitting, spot welding, bolting, or the like.

Figure 7:
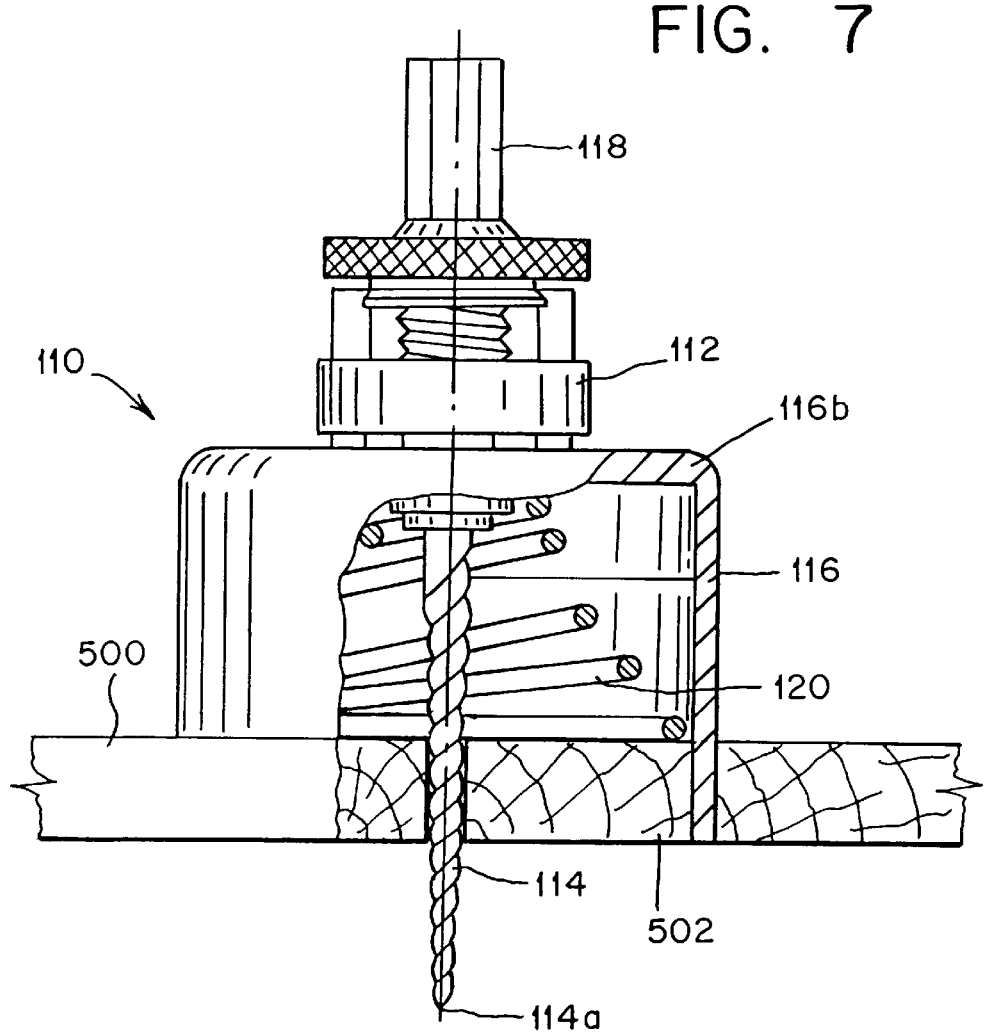
FIG. 7 is a side elevational view in partial section of the hole saw shown in FIG. 2 illustrating the operation of cutting a circular hole in a board.

The hole saw 110 is used by attaching the shank 118 to a power drill and aligning the point 114a of the pilot drill 114 with the center of a circle to be cut out of a board or the like (not shown). The pilot 114 helps to center the hole saw as the hole is being cut. As best illustrated in FIG. 7, as the pilot 114 advances through a board 500, the annular saw blade 116 eventually engages the board 500 and begins to cut a circular hole around the pilot to remove an annular plug 502 from the board 500. Simultaneously, the spring 120 urges the plug out of the space 116c.

Figure 8:
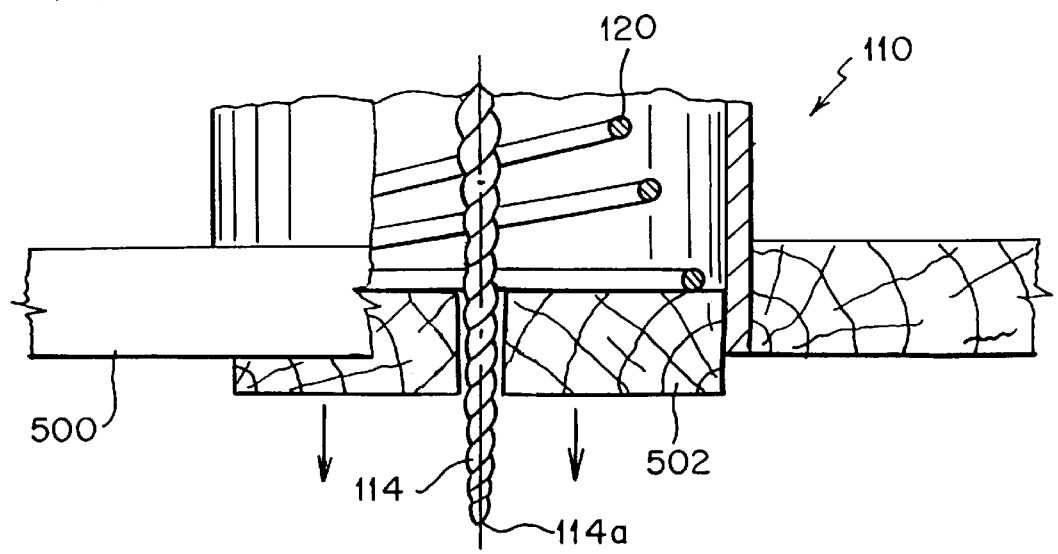
FIG. 8 is a partial side elevational view similar to FIG. 7 wherein the circular hole is cut in the board and the cylindrical plug is ejected from the hole saw.

As illustrated in FIG. 8, when the blade 116 passes completely through the board 500, the cylindrical plug 502 is biased out of the saw 116 and away from the pilot 114. Given the tapered nature of the pilot, little resistance is offered by the pilot to the release of the plug from the saw by the spring. In particular, as the cylindrical plug 502 begins to move downwardly, a clearance or gap is formed desirably between the periphery of the hole in the cylindrical plug 502 and around the periphery of the pilot 114. As cylindrical plug 502 continues to move downwardly, the clearance or gap increases. Generally, the plug pops out of the saw without any need to urge it. With some sticky materials, there may be slight frictional engagement between the plug and the saw. In these cases, slight tapping of the saw will generally release the plug without requiring the use of any other tools.

From the foregoing, those skilled in the art will appreciate that the hole saw according to the invention is easy to use and relatively inexpensive to manufacture. Plugs are substantially automatically removed from the saw without requiring any other tools.

As mentioned above, other modified pilots may be used to facilitate the removal of plugs when cutting different types of materials. For example, FIG. 4 shows a multi-stepped pilot having a longitudinal flute 214a. FIGS. 5 and 5A show a tapered pilot 314 having a fluted bulge 314a. FIGS. 6 and 6A show a tapered pilot 414 having two longitudinal flutes 414a, 414b having a generally rectangular cross section.

There have been described and illustrated herein several embodiments of a hole saw with a modified pilot and plug biasing. While particular embodiments of the invention have been described, it is not intended that the invention be limited thereto, as it is intended that the invention be as broad in scope as the art will allow and that the specification be read likewise. Thus, while particular tapered pilots have been disclosed, it will be appreciated that other tapered pilots could be utilized. Also, while a preferred conically tapered compression spring has been shown, it will be recognized that other types of springs could be used with similar results obtained. Moreover, while particular configurations have been disclosed in reference to the mandrel and the saw blade, it will be appreciated that other configurations could be used as well. It will therefore be appreciated by those skilled in the art that yet other modifications could be made to the provided invention without deviating from its spirit and scope as so claimed.

What is claimed is:

1. A hole saw, comprising:

a) a mandrel;

b) a substantially cylindrical saw blade having a circular cutting edge, said saw blade coupled to said mandrel and defining a cylindrical space; and c) a pilot drill bit coupled to said mandrel having a point and a shank tapered along substantially its entire length to said point extending into said cylindrical space and defining an annular space between said pilot drill bit and said circular saw blade.

2. A hole saw according to claim 1, additionally including:

d) a biasing member coupled to one of said mandrel, said pilot drill bit, and said saw blade for biasing a plug out of said cylindrical space, said biasing member extending into said cylindrical space.

3. A hole saw according to claim 1, wherein:

said pilot drill bit is one of stepped, fluted, and bulged.

4. A hole saw according to claim 1, wherein:

said pilot drill bit is stepped and fluted.

5. A hole saw according to claim 2, wherein:

said pilot drill bit has a bulge.

6. A hole saw according to claim 5, wherein:

said bulge is fluted.

7. A hole saw according to claim 2, wherein:

said pilot drill bit has a rectangular section.

8. A hole saw according to claim 7, wherein:

said rectangular section is fluted.

9. A hole saw according to claim 2, wherein:

said biasing member is a spring.

10. A hole saw according to claim 9, wherein:

said spring is a coil spring.

11. A hole saw according to claim 9, wherein:

said spring is a conical helical spring.

12. A hole saw according to claim 9, wherein:

said spring is substantially coaxial with said pilot drill bit.

* * * * *